United States Patent [19]

Thorne et al.

[11] 4,023,557
[45] May 17, 1977

[54] SOLAR COLLECTOR UTILIZING COPPER LINED ALUMINUM TUBING AND METHOD OF MAKING SUCH TUBING

[75] Inventors: John K. Thorne, Crystal Lake, Ill.; Gary L. Province; Clyde W. Siltanen, both of Decatur, Ala.

[73] Assignee: UOP Inc., Des Plaines, Ill.

[22] Filed: Nov. 5, 1975

[21] Appl. No.: 628,864

[52] U.S. Cl. .................. 126/271; 138/143; 165/133; 165/143; 165/179; 165/180; 428/615

[51] Int. Cl.² .................................... F24J 3/02

[58] Field of Search .......... 126/271, 270; 138/143; 165/133, 143, 179, 180, DIG.8; 29/191, 197, 191.4; 122/DIG. 13

[56] References Cited

UNITED STATES PATENTS

| | | | |
|---|---|---|---|
| 1,799,991 | 4/1931 | Sellick et al. | 165/133 |
| 2,060,034 | 11/1936 | Chandler | 138/143 |
| 2,316,191 | 4/1943 | Scott | 126/271 |
| 2,947,069 | 8/1960 | Carlson et al. | 29/197 |
| 3,267,563 | 7/1966 | Seaton | 165/179 |
| 3,957,030 | 5/1976 | Davis | 126/270 |

*Primary Examiner*—Carroll B. Dority, Jr.
*Assistant Examiner*—Robert J. Charuat
*Attorney, Agent, or Firm*—James R. Hoatson, Jr.; Barry L. Clark; William H. Page II

[57] ABSTRACT

Low cost solar collector panel utilizes surface mounted tubing in which the inner wall portion of the tubing is copper to permit the use of untreated water in the system. The outer wall portion of the tubing is aluminum which provides additional strength and is easily attached to a low cost aluminum absorber plate. A method of producing the composite aluminum-copper tubing in long length coils is disclosed. The tubing can also be formed into connectors for connecting copper and aluminum tubing together.

1 Claim, 6 Drawing Figures

U.S. Patent                May 17, 1977                4,023,557
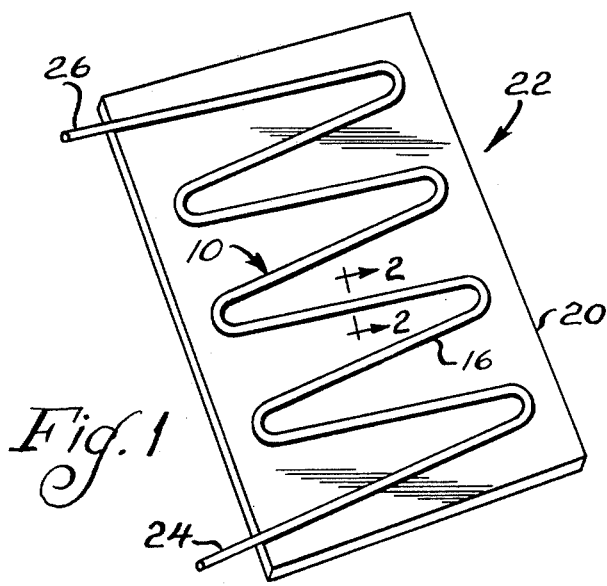
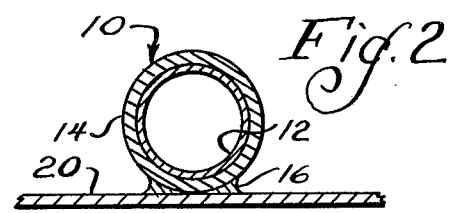
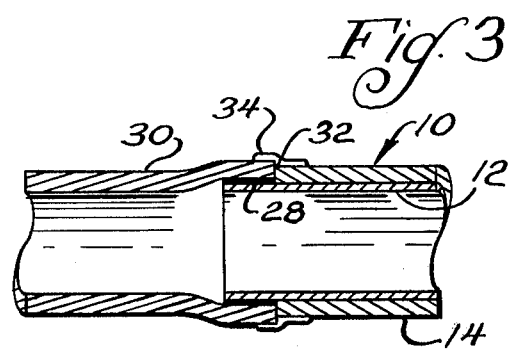
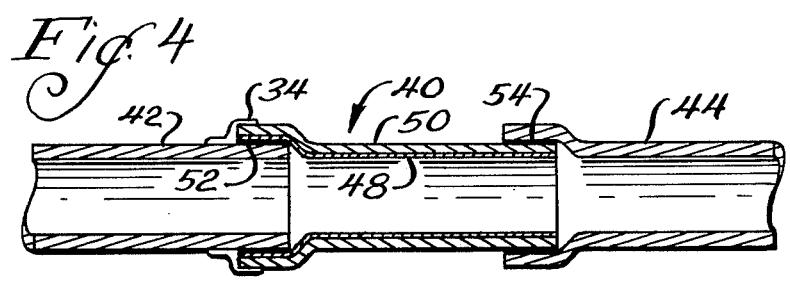
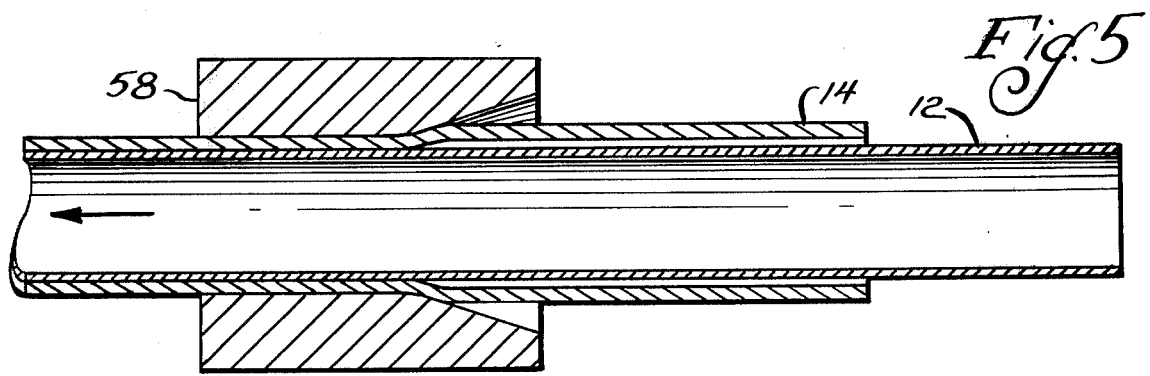
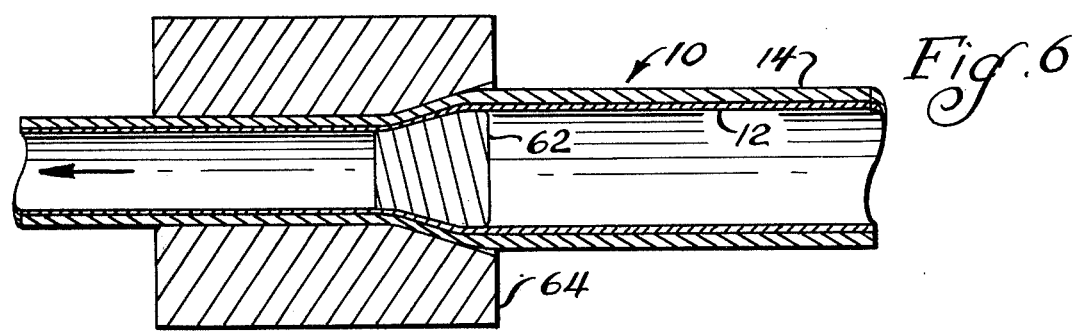

SOLAR COLLECTOR UTILIZING COPPER LINED ALUMINUM TUBING AND METHOD OF MAKING SUCH TUBING

BACKGROUND OF THE INVENTION

This invention relates to specialty tubing and a method of manufacture of long lengths thereof for use, especially, in solar energy flat plate collectors. Such collectors are conventionally made of copper plates onto which copper tubes are soldered, or aluminum plates with aluminum tubes, or copper or aluminum "Rol-Bond" expanded tube-in-sheet. If copper is used for the fluid conduit, domestic water can be satisfactorily heated on a once-through basis. However, corrosion encountered with aluminum requires use of treated water on a recycled basis plus a intermediate heat exchanger. Copper tubes soldered to aluminum plate form a brittle soldered bond. However, aluminum is the preferred material of construction from the standpoint of cost and weight on the roof of a building.

SUMMARY

It is among the objects of the present invention to provide an improved solar collector which is not only lower in cost than previous collectors but includes tubing which is capable of circulating untreated water as well as being relatively easily soldered or otherwise fastened to an aluminum absorber plate. The tubing is a mechanically bonded composite comprising an inner copper tube and an outer aluminum tube. The tubing is made by assembling a length of cpper tube inside a length of aluminum tube, sink drawing the composite to a wall thickness less than the sum of the initial thickness of the two tubes, and then drawing the composite in coil form in several draws on bull block drawing equipment. After drawing, the level wound coil is annealed to a soft temper at a time, temperature and atmosphere compatible with the two metals in order to enhance the mechanical bond between the metals and condition the tube for bending into serpentine form for attachment to a flat absorber plate.

The composite tube material can also be formed into connectors which can be used, for example, in air conditioners to connect copper tubing from the compressor to aluminum tubing from the evaporator.

BRIEF DESCRIPTION OF THE DRAWINGS

FIG. 1 is a perspective view of a flat plate solar collector panel incorporating the improved composite tubing;

FIG. 2 is a cross-sectional view of the improved composite tubing taken on line 2—2 of FIG. 1;

FIG. 3 is a side sectional view showing one means of attaching a copper fitting to the composite tube;

FIG. 4 is a side sectional view showing a connector formed of the composite tube and joined to an aluminum tube and a copper tube;

FIG. 5 is a side sectional view of an assembly of two tubes before and after an initial sink drawing operation; and FIG. 6 is a side sectional view showing the product of FIG. 5 being plug drawn through a drawing die.

DESCRIPTION OF THE PREFERRED EMBODIMENTS

Referring to FIGS. 1 and 2, our improved bimetal tube 10 comprising an inner copper tube 12 and an outer aluminum tube 14 is shown as being bent in a serpentine fashion and soldered or affixed with thermally conductive adhesive 16 to an aluminum plate 20 so as to form a flat plate absorber 22 for a solar collector. Although not shown, in use, the absorber 22 would be mounted in a conventional manner in a housing and covered wth glass or other transparent material. Water, or other heat transfer liquid, would be pumped into one end 24 of the tube 10 and withdrawn from the other end 26 which would normally be elevated to cause the flat plate 20 to be generally normal to the sun's rays.

Since the inner tube member 12 is copper which would galvanically react with the aluminum outer tube member 14 in the presence of water, it is important that proper fittings be attached to tube ends 24, 26 to prevent galvanic action. Flare fittings would prevent such action as would a copper fitting 30 having a bell-shaped end as shown in FIG. 3. In FIG. 3, the end portion of the outer aluminum tube 14 has been cut away to allow a solder bond 28 between the copper fitting 30 and tube 12. Any galvanic action between the copper fitting 30 and aluminum tube 14 at their juncture 32 can be avoided by keeping the juncture dry or by coating it with a protective layer 34 such as epoxy paint.

In FIG. 4, a short segment of bimetal tube is illustrated in use as a connector 40 for connecting together copper tubing 42 and aluminum tubing 44. Although it is often necessary to connect a copper tube such as found on a compressor or a condensor in an air conditioner with an aluminum tube on the evaporator, it is extremely difficult to join the aluminum and copper. By using a composite bimetal connector 40 comprising a copper inner layer 48 diffusion bonded or mechanically bonded to an outer aluminum layer 50, it is possible to easily join the copper surfaces 42, 48 with silver solder 52 and the aluminum surfaces 44, 50 with aluminum solder 54. Although two different metals are exposed to liquid within the connector 40, the liquid would generaly be a refrigerant which would not produce galvanic corrosion.

FIGS. 5 and 6 illustrate two of the steps in the process in which the composite tubing 10 can be made in coils several hundred feet long. The copper tube 12 is manually inserted into the aluminum tube 14 as shown at the right of FIG. 5 and then the left end of the composite is pointed and pulled through the die 58 in a sink draw operation to reduce the thickness of the outer tube 14 and force it into contact with tube 12. A plug 62 is then inserted into the end of the tube, the tube is again pointed and crimped behind the plug 62 (not shown) and the composite tube 10 is reduced in die 64. Preferably, the tube is pulled with bull block drawing equipment and is coiled after each of several drawing steps before being level wound and annealed.

An example of a process used to produce a coil of tubing having 0.500 in. OD × 0.020 in. wall (0.010 in. wall type DHP copper, and 0.010 in. wall type 3003 aluminum) is as follows:

Assemble aluminum at 1.590 in. OD × 0.045 in. wall and copper at 1.450 in. OD × 0.045 in. wall, sink draw the assembly to 1.536 in. OD × 0.088 in. wall, and draw the composite according to the following schedule:

1.310 in. OD × 0.073 in. wall
1.123 in. OD × 0.056 in. wall
0.994 in. OD × 0.044 in. wall
0.870 in. OD × 0.035 in. wall
0.756 in. OD × 0.030 in. wall
0.660 in. OD × 0.0265 in. wall 0.585 in. OD × 0.023 in. wall
0.500 in. OD × 0.020 in. wall.

The hard drawn coil is then level wound, banded, and annealed to a soft temper suitable for bending. The annealing step can comprise purging the ID with nitrogen and crimping the ends to prevent copper oxidation followed by annealing in combusted furnace gases. A short anneal for about 15 minutes at 700° F provides a suitable mechanical bond between the copper and aluminum which facilitates bending while a long anneal of about 4 hours at 900° F develops a diffusion bond which is somewhat brittle and difficult to bend. Although the tube in the example noted above was drawn to a 0.020 in. wall thickness, we have found that bending is greatly facilitated where the wall thickness is somewhat greater, such as 0.035 in. aluminum and 0.015 in. copper. Since the cost of copper for a given wall thickness greatly exceeds the cost of aluminum, it is desirable to keep the copper thickness less than the aluminum.

We claim as our invention:

1. In a solar collector panel of the type including a generally flat aluminum plate absorber member having tubing bonded to it for carrying a heat transfer fluid to and from the panel, the improvement wherein said tubing is a composite comprising an inner copper tube bonded to an outer aluminum tube, said tubing having a wall thickness comprising no greater than 50% copper with the wall thickness of the copper portion being no greater than about 0.020 in.

* * * * *